United States Patent
Cordaro

(10) Patent No.: US 7,014,915 B2
(45) Date of Patent: Mar. 21, 2006

(54) CONTROLLED BINARY MACROSEGREGATED POWDER PARTICLES, THEIR USES, AND PREPARATION METHODS THEREFOR

(75) Inventor: James F. Cordaro, Ridgecrest, CA (US)

(73) Assignee: The Boeing Company, Chicago, IL (US)

( * ) Notice: Subject to any disclaimer, the term of this patent is extended or adjusted under 35 U.S.C. 154(b) by 285 days.

(21) Appl. No.: 10/225,336

(22) Filed: Aug. 20, 2002

(65) Prior Publication Data
US 2004/0038066 A1 Feb. 26, 2004

(51) Int. Cl.
B32B 5/16 (2006.01)
C09C 1/04 (2006.01)

(52) U.S. Cl. .............. 428/402; 428/323; 428/328; 428/329; 106/426; 106/635

(58) Field of Classification Search .......... 428/402, 428/547, 570, 610, 328, 329, 640, 642
See application file for complete search history.

(56) References Cited

U.S. PATENT DOCUMENTS

| | | | | |
|---|---|---|---|---|
| 3,627,682 A | * | 12/1971 | Hall et al. | 430/106.2 |
| 3,653,942 A | * | 4/1972 | Boebel et al. | 244/158 R |
| 3,808,052 A | * | 4/1974 | Dey | 429/337 |
| 3,842,895 A | * | 10/1974 | Mehrabian et al. | 164/466 |
| 4,046,643 A | * | 9/1977 | Rippere | 205/103 |
| 4,273,595 A | | 6/1981 | Inoue et al. | |
| 4,402,745 A | * | 9/1983 | Ray et al. | 148/332 |
| 4,429,341 A | * | 1/1984 | King | 361/117 |
| 4,462,454 A | * | 7/1984 | Hellawell | 164/133 |
| 4,519,439 A | * | 5/1985 | Fredriksson et al. | 164/476 |
| 4,557,770 A | * | 12/1985 | Vidoz et al. | 148/437 |
| 4,709,747 A | * | 12/1987 | Yu et al. | 164/487 |
| 4,891,059 A | * | 1/1990 | Diamond et al. | 75/352 |
| 5,110,374 A | * | 5/1992 | Takeshita et al. | 148/101 |
| 5,271,758 A | * | 12/1993 | Buljan et al. | 75/232 |
| 5,381,125 A | | 1/1995 | Chen et al. | |
| 5,431,747 A | * | 7/1995 | Takebuchi et al. | 148/302 |
| 5,460,640 A | * | 10/1995 | Buljan | 75/233 |
| 5,574,961 A | * | 11/1996 | Edelstein et al. | 428/548 |
| 5,656,250 A | | 8/1997 | Tanaka et al. | |
| 5,807,909 A | | 9/1998 | Cordaro et al. | |
| 5,820,669 A | * | 10/1998 | Cordaro | 106/635 |
| 6,001,507 A | * | 12/1999 | Ono et al. | 429/217 |

(Continued)

OTHER PUBLICATIONS

Mathiesen et al., "Time Resolved X-Ray Imaging of Dendritic Growth in Binary Alloys", Phys. Rev. Let. vol. 83, No. 24, 5062-65, Dec. 1999.*

Primary Examiner—H. Thi Le
(74) Attorney, Agent, or Firm—McNees Wallace & Nurick LLC

(57) ABSTRACT

A material has a mass of powder particles. The mass of powder particles includes controlled binary macrosegregated powder particles made of at least two constituent elements. Each controlled binary macrosegregated powder particle has a chemically binary structure wherein the chemical composition varies from one side to the other side of the powder particle. The controlled binary macrosegregated powder particles may be used in applications which conventionally employ homogeneous powder particles, such as paints, solar cells, and the like. A paint uses as its pigment the controlled binary macrosegregated powder particles whose compositions are within the chemical system $Zn(Al, Ga)_2O_4$, and an inorganic or organic binder. The controlled binary macrosegregated powder particles are made by chemical synthesis at temperatures below those conventionally used to prepare homogeneous particles.

29 Claims, 6 Drawing Sheets

U.S. PATENT DOCUMENTS

| | | | |
|---|---|---|---|
| 6,099,637 A * | 8/2000 | Cordaro | 106/635 |
| 6,124,378 A * | 9/2000 | Cordaro et al. | 523/179 |
| 6,319,868 B1 | 11/2001 | Gani et al. | |
| 6,405,979 B1 * | 6/2002 | Cordaro | 244/163 |
| 6,599,662 B1 * | 7/2003 | Chiang et al. | 429/218.1 |
| 6,679,456 B1 * | 1/2004 | Cordaro | 244/163 |
| 6,686,089 B1 * | 2/2004 | Fujiwara et al. | 429/213 |
| 6,830,221 B1 * | 12/2004 | Janson et al. | 244/158 R |

* cited by examiner

CONTROLLED BINARY MACROSEGREGATED POWDER PARTICLES, THEIR USES, AND PREPARATION METHODS THEREFOR

This invention relates to the preparation and physical characteristics of controlled binary macrosegregated powder particles, and to materials and articles that use the powder particles.

BACKGROUND OF THE INVENTION

Fine powder particles, typically less than about 15 micrometers in size, are used in a large number of different applications. Such particles may be made by a variety of techniques that produce homogeneous structures and chemical compositions within the particles. The particles are usually mixed into a flowable matrix or binder, which is then hardened by solidification or curing, so that the mixture may be used in structural applications. The resulting mixture exhibits properties of both phases. The properties of the mixture may be tailored through the compositions and relative amounts of the phases, the sizes of the particles, and other controllable parameters.

In an example discussed in U.S. Pat. Nos. 5,807,909 and 5,820,669, fine powder particles having compositions in the $(Zn,Mg,Cd)(Al,Ga)_2O_4$ family are mixed with organic or inorganic binders to form white paints that are applied to the external surfaces of spacecraft such as communications satellites. The resulting paints have extremely low absorptances and high emissivities, and are therefore advantageously used on the sun-facing side of the spacecraft. They are also sufficiently electrically conductive to dissipate the electrostatic charges that otherwise build up on the external surfaces of the spacecraft during service and may disrupt the electronic systems of the spacecraft if not dissipated. The properties of the paints are retained and do not substantially degrade for many years in the high-radiation geosynchronous-orbit space environment.

While such paints have provided an important advance in the protection of spacecraft, there is always a need for further improvements. Additionally, because mixtures of particles in matrices and binders share some common characteristics regardless of their use, the sources of advancement in fields such as paints may yield beneficial results in other fields using such mixtures. The present invention fulfills the need for such improvements, and further provides related advantages.

SUMMARY OF THE INVENTION

The present approach provides for a particulate material, articles using the material, and methods for their manufacture. The particulate material has properties unlike any others. Each powder particle, which is typically less than 25 micrometers in size, has a controlled macrosegregation in the form of different compositions on the opposite sides of the particle, leading to different properties on the opposite sides of the particle. The gradation of properties may be used to advantage in applications such as paints, electronic devices, and magnetic devices.

In accordance with the invention, a material comprises a mass of powder particles. The mass of powder particles in turn comprises controlled binary macrosegregated powder particles having at least two constituent elements. Each controlled binary macrosegregated powder particle has a chemically binary structure with a first chemical concentration of at least two elements at a first side of each controlled binary macrosegregated powder particle and a second concentration of at least two elements on an oppositely disposed second side of each controlled binary macrosegregated powder particle. The second concentration is different from the first concentration. In a preferred case, each controlled binary macrosegregated powder particle has an average concentration that is about the average of the first concentration and the second concentration, at an average location that is the average of a first location of the first side and a second location of the second side.

Each powder particle has a "controlled binary macrosegregated" chemical structure. In such a chemical structure, the chemical composition controllably varies from one side of the particle to the other, hence is "macrosegregated" even though the particles may be small. Such a macrosegregation is contrasted with local microsegregated variations within the interior of the particle, such as might occur as a result of a random or a periodic precipitation of a second phase within the particle, and from random compositional variations. The macrosegregation is "binary", in that it is characterized by the first chemical concentration of the constituents on the first side of each particle, and the second chemical concentration of the constituents on the second side of each particle.

In the preferred application, each powder particle is typically from about 0.5 to about 25 micrometers, most preferably about 1 to about 15 micrometers, in size. The mass of powder particles may be an unbound, free-flowing mass of powder particles. There may instead be a binder, and the mass of powder particles is mixed with and bound together by the binder.

In an application of interest, the controlled binary macrosegregated powder particles are oxides. In one case, at least two elements comprise zinc, gallium, aluminum, and oxygen, and the controlled binary macrosegregated powder particles have a normal spinel crystal structure. Thus, for example, the controlled binary macrosegregated powder particles may be within the chemical system $(Zn,Mg,Cd)(Al,Ga)_2O_4$, and the binder is an organic material or an inorganic material such as a silicate. The controlled binary macrosegregated powder particles may instead be photoactive semiconductors or magnetically active materials, for example.

Thus, in one embodiment an article comprises a plurality of particles comprising a plurality of controlled binary macrosegregated powder particles. Each controlled binary macrosegregated powder particle has a net composition of $A[xAl(1-x)Ga]_2O_4(\delta D)$, where A is selected from the group consisting of zinc, magnesium, and cadmium and combinations thereof, D is a dopant selected from the group consisting of a cationic dopant having an ionic valence greater than +2 and an anionic dopant, the value of x is from greater than 0 to less than 1, and the value of $\delta$ is from 0 (inclusive) to about 0.2 (inclusive). Each controlled binary macrosegregated powder particle has a chemically binary structure with a first chemical concentration at a first side of each controlled binary macrosegregated powder particle and a second concentration on an oppositely disposed second side of each controlled binary macrosegregated powder particle. The second concentration is different from the first concentration.

A condensed-phase binder is mixed with the particles to form a mixture. Preferably, the binder is an organic binder or an inorganic binder, and the ratio by weight of particles to binder is about 5:1 or less. The binder may be an inorganic silicate such as potassium silicate. The binder may be an organic binder selected, for example, from the group consisting of dimethyl silicone, silicone-modified epoxy, poly (dimethyl-siloxane), poly(dimethyl-siloxane-co-methylphenyl-siloxane), polyurethane, polyimide, polyamide, polyurea, polyimide, polyester, polyethylene terepthalate polyester, and polytetrafluoroethylene.

The mixture of binder and particles may be flowable, a freestanding solid film, or a solid paint layer in contact with a surface of a substrate. In a typical case, the ratio by weight of particles to binder is from about 2:1 (more preferably 3:1) to about 5:1. There may also be present a plurality of optically active secondary particles, and/or a plurality of inert particles. This paint material is most preferably used as an electrical-charge-dissipating paint applied to an external surface of a skin of a spacecraft.

Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

DETAILED DESCRIPTION OF THE INVENTION

Figure 1:
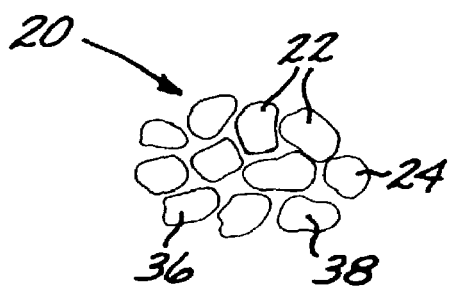
FIG. 1 is a schematic view of a mass of powder particles with no binder present.
Figure 2:
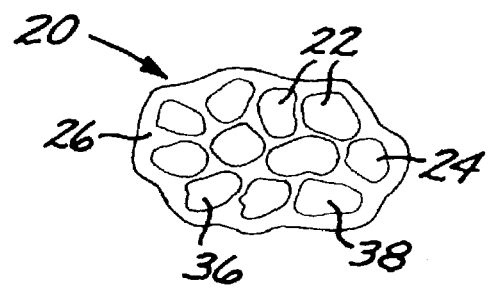
FIG. 2 is a schematic view of a mass of powder particles bound together with a binder.

A material 20 comprises a mass of powder particles 22, as illustrated in FIGS. 1 and 2. The mass of powder particles 22 comprises a plurality of controlled binary macrosegregated powder particles 24. Each controlled binary macrosegregated powder particle 24 is typically, but not necessarily, less than about 25 micrometers in maximum dimension, and a preferred size is from about 0.3 to about 15 micrometers. The mass of powder particles 22 may be in the form of an unbound, free-flowing mass of powder particles, as in FIG. 1. The mass of powder particles 22 may instead be mixed with and bound together by a binder 26, as in FIG. 2. The free-flowing mass of powder particles illustrated in FIG. 1 may subsequently be bound together, as by sintering with or without a binder present, or by bonding the powder particles together with a binder as in FIG. 2.

Figure 3:
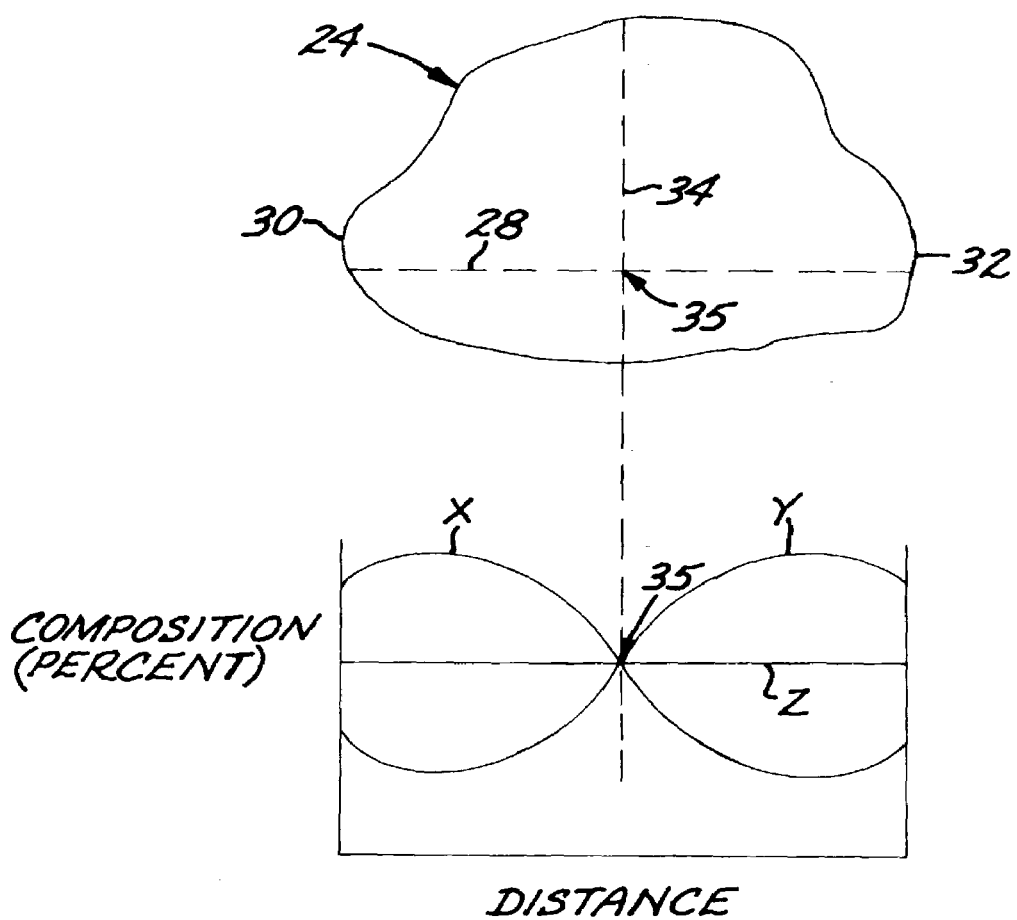
FIG. 3 is an enlarged schematic view of a single controlled binary macrosegregated powder particle, with an associated idealized graph illustrating the variation in chemical composition from side to side of the particle.
Figure 4:
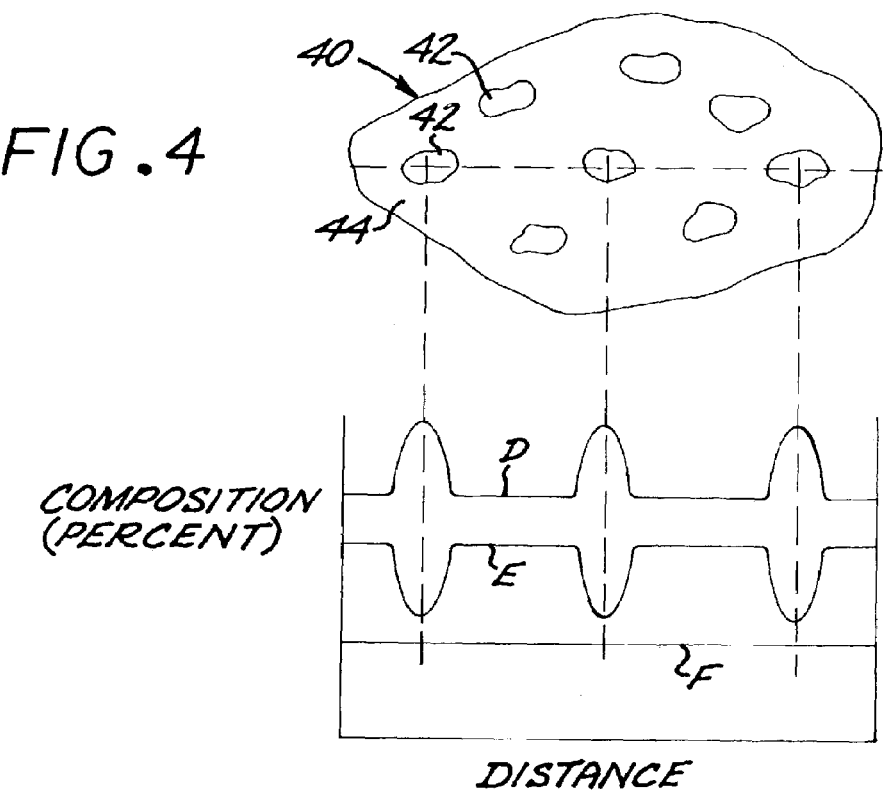
FIG. 4 is an enlarged schematic view of a single powder particle having local chemical variations therein, with an associated graph illustrating the variation in chemical composition from side to side of the particle.
Figure 5:
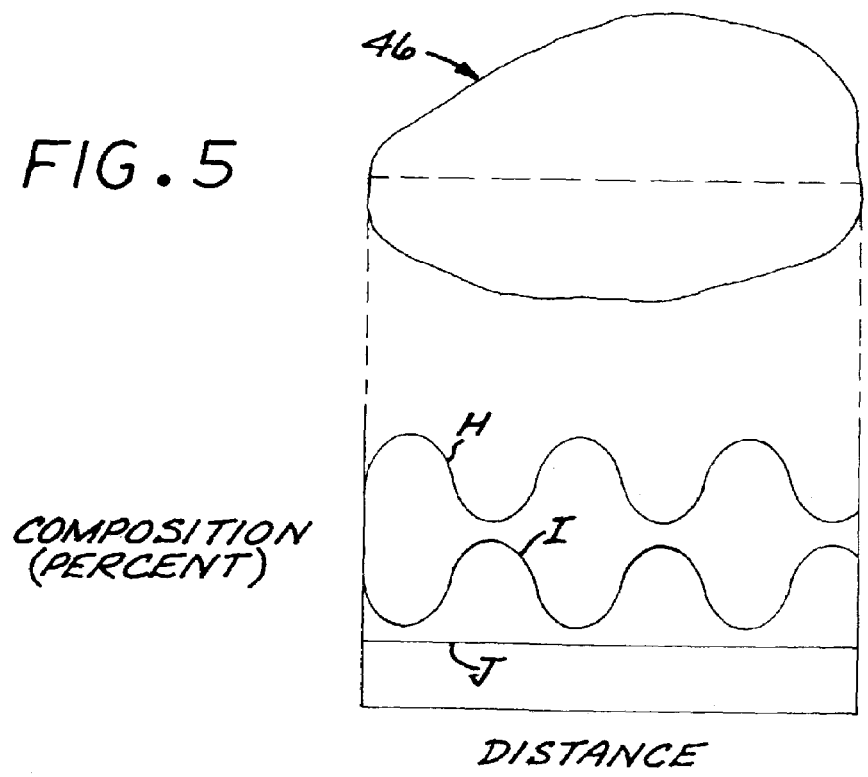
FIG. 5 is an enlarged schematic view of a single powder particle having periodic local chemical variations therein, with an associated graph illustrating the variation in chemical composition from side to side of the particle.

In either case, each controlled binary macrosegregated powder particle 24 is made of at least two constituent elements. Each controlled binary macrosegregated powder particle 24 has a chemically binary structure that is illustrated in FIG. 3. FIG. 3 depicts one of the binary macrosegregated powder particles 24, with a composition profile line 28 superimposed. The associated graph illustrates the composition of the binary macrosegregated powder particle measured along the composition profile line 28, for three elements X, Y, and Z. (The composition profile graphs of FIGS. 3–5 present the composition changes across a single particle, not across a mass of particles which have different compositions.) There is a first chemical concentration of the at least two elements at a first side 30 of the controlled binary macrosegregated powder particle 24, and a second concentration of the at least two elements on an oppositely disposed second side 32 of each controlled binary macrosegregated powder particle 24. The second concentration is different from the first concentration.

In the exemplary idealized illustration of FIG. 3, the first chemical concentration at the first side 30 has a high percentage of X, a low percentage of Y, and an intermediate percentage of Z. The second chemical concentration at the second side 32 has a low percentage of X, a high percentage of Y, and an intermediate percentage of Z. (The composition of Z is unchanged across the controlled binary macrosegregated powder particle 24 in this case, illustrating the possibility that some elements may be unchanged. However, at least some of the elements such as X and Y must change for a particle to be within the scope of the invention.). This systematic, gradual, generally continuous gradation of chemical composition from one side of the controlled binary macrosegregated powder particle to the other is an important feature of the present approach.

In the preferred case, as illustrated in FIG. 3, each controlled binary macrosegregated powder particle 24 has an average concentration that is about the average of the first concentration and the second concentration, at an average location 34 that is the average of a first location of the first side 30 and a second location of the second side 32. This average location 34 defines the location of a diffuse interface 35 between the chemical concentrations nearer to the first side 30 and the chemical concentrations nearer to the second side 32. In practical applications of the present invention to be discussed subsequently, the presence of the internal diffuse interface 35 within each controlled binary macrosegregated powder particle 24 at about the center of each controlled binary macrosegregated powder particle 24 has important consequences.

Thus, the powder particles 24 are "macrosegregated" because there is a systematic variation from one side of the particle to the other, even though the particles are relatively small in size. The macrosegregated powder particles are "binary" because the compositions at the two sides of the particle may be expressed as two distinct values. The degree of binary macrosegregation is controlled by the preparation procedure discussed subsequently.

FIGS. 4–5 are similar in form to FIG. 3 in showing the chemical composition variation across the particle, but illustrate other possible chemical composition variations with particles that are not within the scope of the invention. In FIG. 4, a powder particle 40 has a microstructure of precipitates 42 within a matrix 44. The composition of elements D and E varies across the powder particle 40 according to whether the composition is measured in one of the precipitates 42 or within the matrix 44, but there is no systematic composition variation from one side to the other of the particle powder 40. In FIG. 5, a powder particle 46 has a periodic variation in the compositions of elements H and I, as for example in a superlattice structure or a spinodally decomposed structure, but again there is no systematic variation of these elements from one side of the particle to the other. Thus, there is an interleaving of the different compositions. In some situations where particles like those of FIG. 5 are produced, portions of one composition may be removed as by leaching, leaving a skeleton of the other composition, see for example U.S. Pat. No. 6,319,868. That is not possible with the present approach, because the different compositions are not interleaved with each other but instead are binary macrosegregated.

The operability of the present invention does not depend upon any particular explanation of the binary macrosegregation. Although the cause is not known with certainty, it is believed that the macrosegregation may result from a spinodal-like phase separation due to a miscibility gap in the equilibrium phase diagram of the constituent elements. The binary nature of the macrosegregation may arise when a large difference in the lattice constants of the phases results in a high mismatch energy at each interface between the phases. To achieve a minimum energy, the phase separation is to a single binary macrosegregation across the width of the particle and the resulting single diffuse interface. The binary macrosegregation may also result in part from the kinetics of diffusion of the constituent atoms during the phase separation process.

In one application of interest, the controlled binary macrosegregated powder particles 24 are oxides, most preferably with a normal spinel crystal structure. In one such embodiment, the at least two elements comprise zinc, gallium, aluminum, and oxygen.

More specifically, the controlled binary macrosegregated powder particles 24 may have chemical compositions of the form $(Zn,Mg,Cd)(Al,Ga)_2O_4$. The use of parentheses in this expression is a standard chemical notation meaning that the first constituent may be Zn, Mg, and/or Cd, in any combination or relative amount. The second constituent may be Al or Ga, in any combination or relative amount. However, the atomic ratios of the total of the first constituent, the total of the second constituent, and oxygen must be substantially 1:2:4, although small variations are acceptable. Small amounts of additional elements such as dopants may also be present. In one embodiment, each controlled binary macrosegregated powder particle 24 has a net composition of $A[xAl(1-x)Ga]_2O_4(\delta D)$. A is selected from the group consisting of zinc, magnesium, and cadmium, D is a dopant selected from the group consisting of a cationic dopant having an ionic valence greater than +2 and an anionic dopant, the value of x is from greater than 0 to less than 1 (i.e., the range extending from 0 to 1, but excluding the end points of 0 and 1), and the value of $\delta$ is from 0 to about 0.2. Such particles are disclosed in U.S. Pat. Nos. 5,807,909 and 5,820,669, and whose disclosures are incorporated by reference. The powder particles in those patents, however, are of substantially uniform composition and not of the controlled binary macrosegregated type.

These particular powder types may be mixed with the condensed-phase (i.e., solid or liquid) binder 26, and possibly other constituents, to form white paints that have some degree of electrical conductivity. Such paints are useful for temperature control and electrostatic-discharge control when applied to the outer skins of spacecraft. The binder 26 may be an inorganic material such as an inorganic silicate (e.g., potassium silicate), or an organic material such as, for example, dimethyl silicone, silicone-modified epoxy, poly (dimethyl-siloxane), poly(dimethyl-siloxane-co-methylphenyl-siloxane), polyurethane, polyimide, polyamide, polyurea, polyimide, polyester, polyethylene terephthalate polyester, and polytetrafluoroethylene. The mixture of controlled binary macrosegregated powder particles 24 and binder 26 is initially flowable when the binder is flowable, but hardens and becomes a nonflowable solid when the binder hardens. The binder 26 is typically present in an amount such that the ratio by weight of controlled binary macrosegregated powder particles to binder is about 5:1 or less, and preferably is from about 2:1 (more preferably about 3:1) to about 5:1. Mixed with the controlled binary macrosegregated powder particles 24 and the binder 26 may optionally be a plurality of optically active secondary particles 36 and/or a plurality of inert particles 38. Further details are set forth in the '909 and '669 patents.

Figure 6:
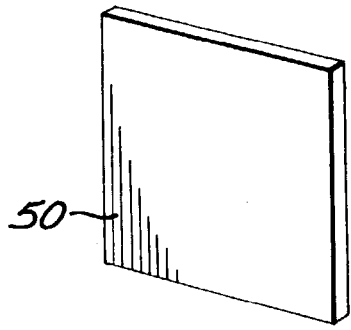
FIG. 6 is a perspective view of a freestanding film made with the mass of controlled binary macrosegregated powder particles in a binder.
Figure 7:
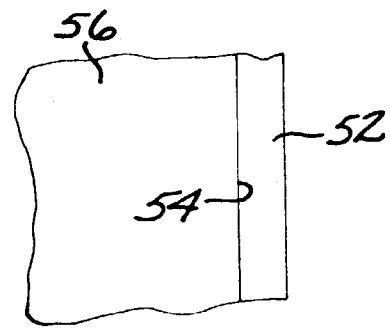
FIG. 7 is a schematic view of a substrate coated with a paint layer.

When the binder is solid, the mixture of binder 26 and controlled binary macrosegregated powder particles 24 may be a freestanding piece, such as the freestanding solid film 50 of FIG. 6. The mixture of binder 26 and controlled binary macrosegregated powder particles 24 may instead be a solid paint layer (or coating) 52 in contact with a surface 54 of a substrate 56, as shown in FIG. 7.

Figure 8:
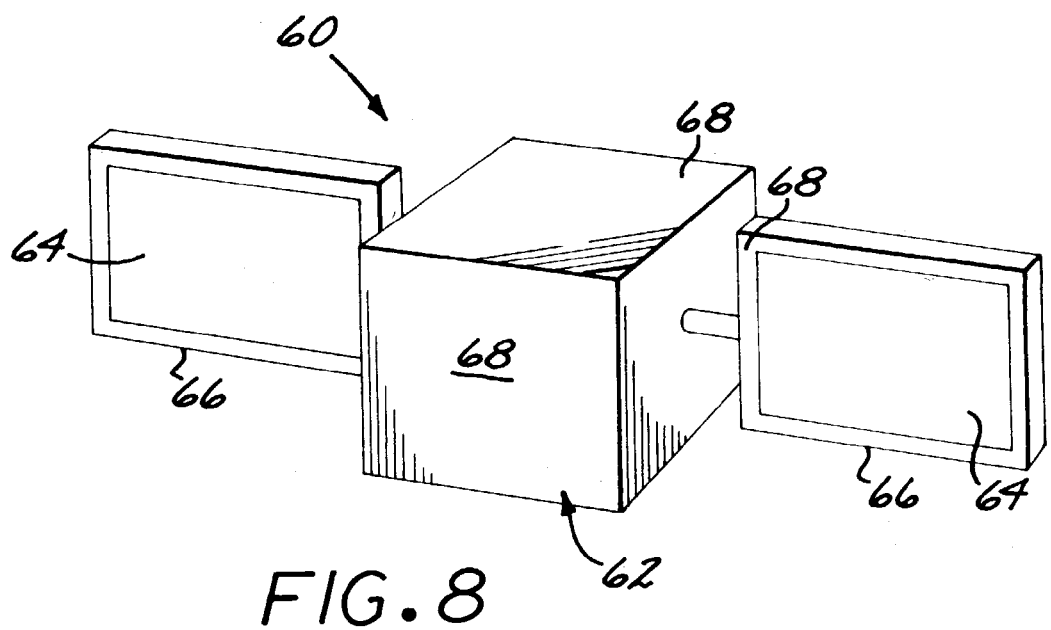
FIG. 8 is a schematic perspective view of a spacecraft having a portion thereof coated with a paint utilizing the controlled binary macrosegregated powder particles as a pigment.

The paint prepared according to the present approach may be used in a thermal control application. Most preferably, it is used as the solid paint layer 52 on a spacecraft, such as a satellite 60 illustrated in FIG. 8. The spacecraft 60, here depicted as a communications satellite that is positioned in geosynchronous orbit when in service, has a body 62 with solar panels 64 mounted either on the body 62 or on wings 66 that extend outwardly from the body 62, or both. The body 62 and wings 66 have a skin 68 which may be made of a metal, a nonmetal, or a composite material, and which may be supported by an underlying skeletal structure. At least some of those outwardly facing portions of the skin 68 of the body 62 and/or the wings 66 which are not solar panels are covered with the solid paint layer 52 of the material of the invention, as described above. Such a paint is typically from about 0.001 to about 0.010 inches thick, and more preferably from about 0.001 to about 0.007 inches thick. If the paint layer 52 is thinner, there is insufficient coverage of the surface 54. If the paint layer 52 is thicker, it tends to delaminate and peel away from the substrate 56. The skin of the spacecraft thereby serves as the substrate 56 to which the paint layer 52 is applied. The preferred paint layer 52 comprises the $A[xAl(1-x)Ga]_2O_4(\delta D)$ controlled binary macrosegregated powder particles 24 discussed above, with a potassium silicate binder 26. The paint layer 52 provides the covered portions with passive thermal control and electrostatic charge dissipation. The paint is sufficiently durable and stable in its properties for use on extended missions of 15 years in geosynchronous earth orbit.

Figure 9:
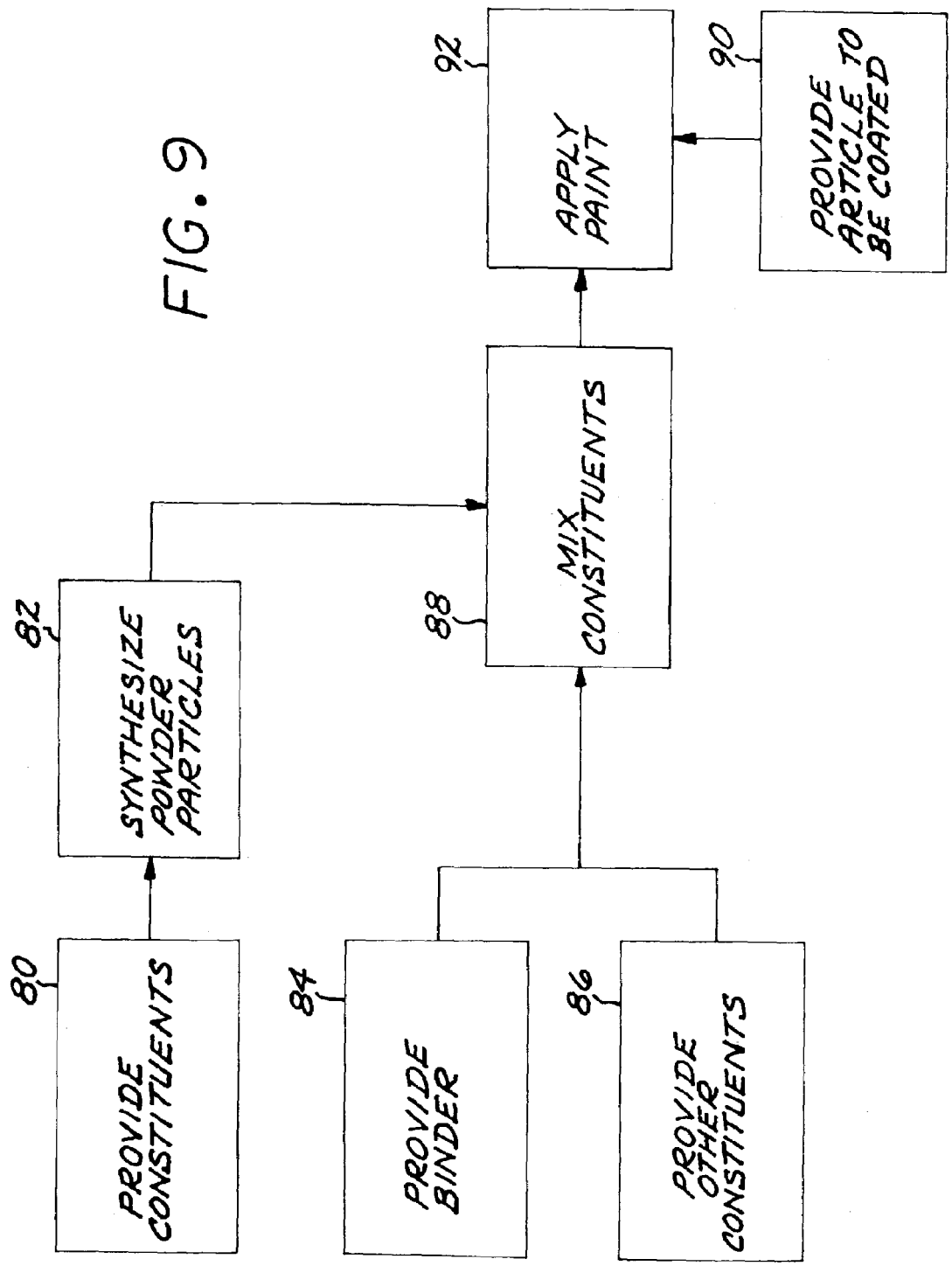
FIG. 9 is a block flow diagram of a method for preparing the controlled binary macrosegregated powder particles and an article from the controlled binary macrosegregated powder particles.

FIG. 9 depicts a preferred method of preparing the controlled binary macrosegregated powder particles 24, and then using those controlled binary macrosegregated powder particles 24 in a preferred application, a spacecraft paint. The constituents of the controlled binary macrosegregated powder particles 24 are provided, step 80. In the case of the preferred oxide powder particles in the compositional system $(Zn,Mg,Cd)(Al,Ga)_2O_4$, the constituents are provided in the form of oxides, such as zinc oxide, magnesium oxide, cadmium oxide, aluminum oxide, and gallium oxide, in the proper proportions. The dopant D, if any, is also provided as its oxide.

The controlled binary macrosegregated powder particles 24 are synthesized, step 82, by intimately mixing the constituents together and then heating them to a reaction temperature at which they chemically react. Additionally, at the reaction temperature the Gibbs free energy diagram has two minima at different compositions, indicative of a phase-separation miscibility gap. The reaction produces the compositions corresponding to those two minima and gradations therebetween. The compositions corresponding to the two minima are the compositions illustrated in FIG. 3 at the two sides 30 and 32 of the controlled binary macrosegregated powder particles 24. In the case of the $Zn(Al,Ga)_2O_4$ system, the reaction temperature is less than 1000° C., and is preferably from about 850° C. to about 975° C. The heating is preferably performed in air or other oxidizing atmosphere. If the reaction temperature is less than about 850° C., the desired reaction occurs but is very slow and uneconomical. If the reaction temperature is greater than about 1000° C., the desired binary segregation does not occur in the powder particles. Instead, the powder particles are conventional, with a generally chemically homogeneous structure. At a reaction temperature of about 950° C., the time to form controlled binary macrosegregated powder particles 24 of a size of 5 micrometers is about 6 hours.

This completes the synthesis of the controlled binary macrosegregated powder particles 24.

To make a paint, the binder is provided, step 84. Any other constituents, such as the optically active secondary particles 36 and/or the inert particles 38, are provided, step 86. The controlled binary macrosegregated powder particles 24, the binder 26, and the other constituents are mixed together to form the flowable paint, step 88. The article to be coated, such as the skin 68 of the spacecraft 60, is provided, step 90. The flowable paint mixture is applied to the article, step 92. The paint mixture is applied by any operable approach, such as spraying or brushing, and allowed to dry by evaporation of any carrier that is present. The binder is cured, if necessary, by heating the paint to a curing temperature. The details of the steps 84, 86, 88, 90, and 92 may be found in the '909 and '668 patents, as these steps are identical to those set forth in those patents except as described herein.

The method of FIG. 9 has been reduced to practice for a paint using controlled binary macrosegregated powder particles having a net composition, in weight percent, of 33 percent ZnO, 2 percent $In_2O_3$, 18 percent $Al_2O_3$, and 47 percent $Ga_2O_3$, and a potassium silicate binder. The "net" composition is the composition of the powder particles established by the types and amounts of the constituents, but the local composition of the powder particles varies across the width of the powder particles as described herein. A paint layer 52 using the controlled binary macrosegregated powder particles 24 applied to an aluminum substrate in a thickness of 0.0056 inches had a solar absorptance of 0.0518 and an emissivity of 0.895. By comparison, an identical specimen made using the same net composition of the powder particles but in a homogeneous (not controlled binary macrosegregated) form had a solar absorptance of about 0.07 and about the same emissivity. The reduction of the solar absorptance from about 0.07 for the paint using the conventional powder particles to about 0.0518 for the paint using the controlled binary macrosegregated powder particles is highly significant for potential spacecraft applications.

To effect absorptance of light, the controlled binary macrosegregated powder particles 24 in the paint layer 52 diffract the light. This diffraction is made more effective by the presence of the diffuse interface 35 and the different refractive indices of the material on either side of the diffuse interface 35. It is preferred that the controlled binary macrosegregated powder particles 24 used as the pigment in the paint layer 52 be relatively small in size, on the order of the wavelength of visible light. The result of this small size is that there is enhanced scattering of the light from the diffuse interfaces 35 and from the interfaces of the controlled binary macrosegregated powder particles 24 and the binder 26. Metal particles, which are not transparent to visible light, do not show this effect.

The controlled binary macrosegregated powder particles are in a lower free energy state, and therefore are more thermodynamically stable, than are the conventional powder particles of generally uniform composition, due to the phase separation utilized to achieve the controlled binary macrosegregated state. It is therefore expected that the controlled binary macrosegregated powder particles exhibit greater resistance to radiation damage than do conventional powder particles.

Figure 10:
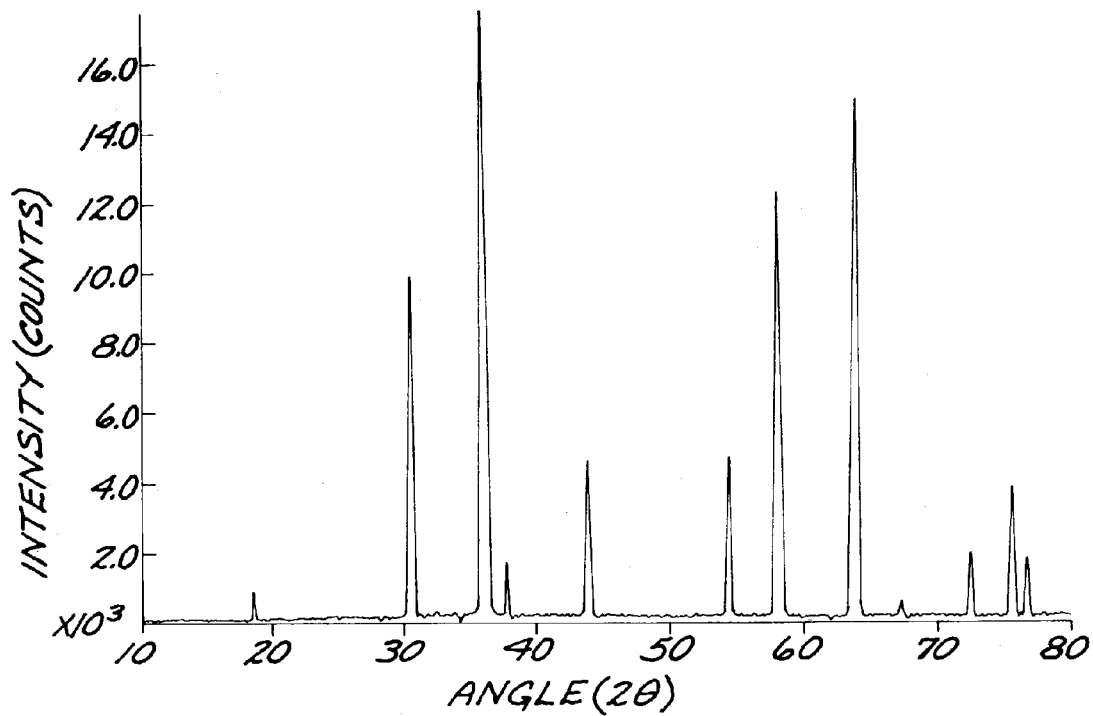
FIG. 10 is an X-ray powder diffraction pattern taken from a mass of conventional $Zn(Al,Ga)_2O_4$ powder particles.
Figure 11:
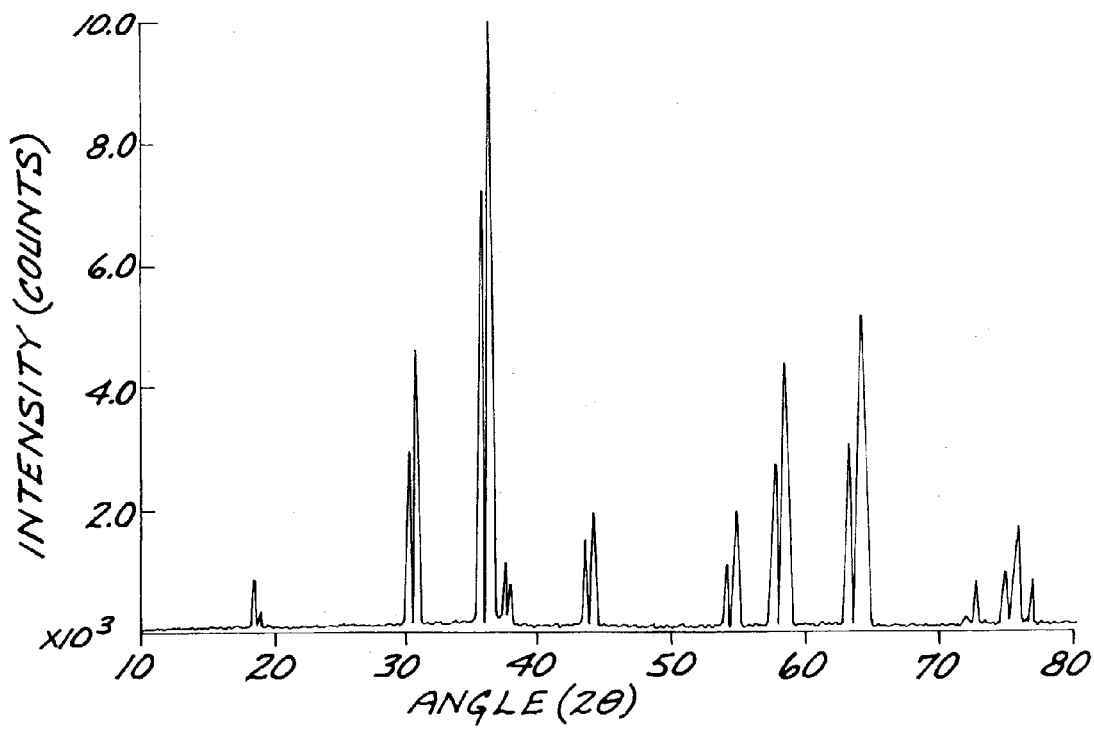
FIG. 11 is an X-ray powder diffraction pattern taken from a mass of controlled binary macrosegregated $Zn(Al,Ga)_2O_4$ powder particles.
Figure 12:
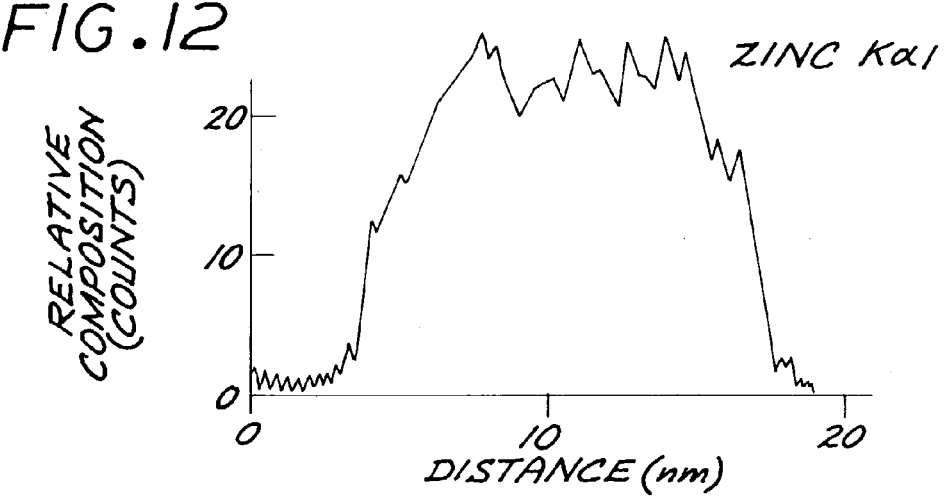
FIG. 12 is a set of composition profiles measured across a controlled binary macrosegregated powder particle.
Figure 12:
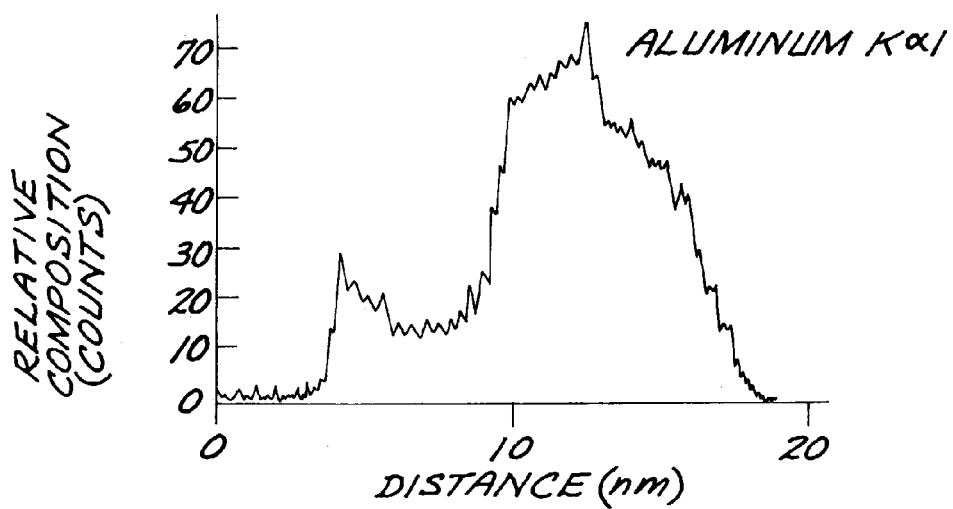
Figure 12:
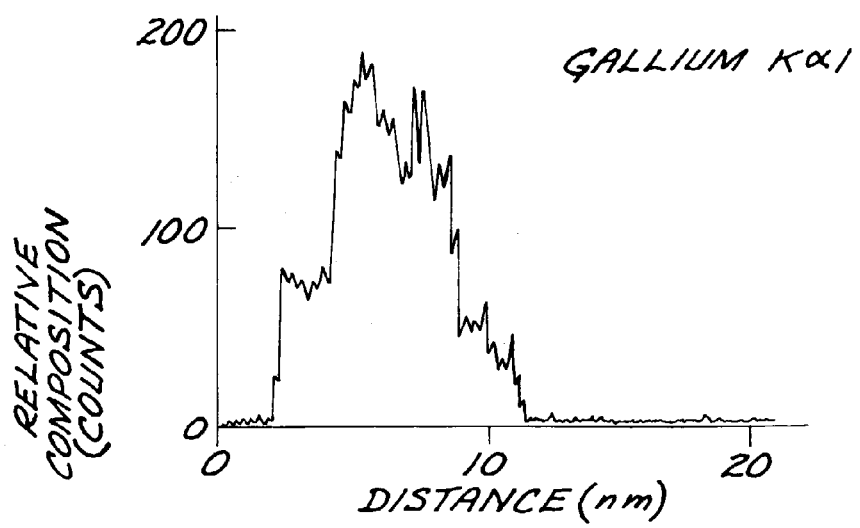

The controlled binary macrosegregated powder particles were studied and compared with conventional particles of a similar composition. FIG. 10 is an X-ray diffraction pattern taken from a mass of the conventional powder particles, and FIG. 11 is an X-ray diffraction pattern taken from a mass of the controlled binary macrosegregated powder particles. The peaks in FIG. 10 are not split, indicating a uniform composition of the conventional powder particles. The peaks in FIG. 11 are split, indicating different lattice parameters and thence different compositions present in the binary macrosegregated powder particles. From the split in the peaks it was calculated that the compositions on the two sides of the particles had compositions of approximately $ZnAl_{.008}Ga_{1.92}O_4$ and $ZnAl_{1.39}Ga_{0.61}O_4$, based on a net composition of $ZnAl_{0.8}Ga_{1.2}O_4$. That is, the zinc composition was approximately constant across the controlled binary macrosegregated powder particles, while the aluminum and gallium varied considerably. FIG. 12 is a set of micro-compositional profiles of a single representative controlled binary macrosegregated powder particle, obtained by energy dispersive X-ray microanalysis (EDX). As may be seen, the zinc composition is approximately constant across the controlled binary macrosegregated powder particle, while the aluminum and gallium vary in opposite directions across the controlled binary macrosegregated powder particle from low values on one side of the powder particle to high values on the other side.

The preferred embodiment of the invention, which has been developed furthest, is the paint application discussed above. The principles of controlled binary macrosegregated powder particles may be applied to other applications as well. For example, the controlled binary macrosegregated powder particles may be photoactive semiconductors, such as $CdInGaS_4$. This composition may be formed by binary macrosegregation so that one side of the particle is gallium rich and indium depleted, and the other side is gallium depleted and indium rich. In another application, the particles may be magnetically active.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. An article comprising
a plurality of particles comprising a plurality of controlled binary macrosegregated powder particles,
wherein each controlled binary macrosegregated powder particle has a net composition of $A[xAl(1-x)Ga]_2O_4(\delta D)$, A is selected from the group consisting of zinc, magnesium, and cadmium, D is a dopant selected from the group consisting of a cationic dopant having an ionic valence greater than +2 and an anionic dopant, the value of x is from greater than 0 to less than 1, and the value of $\delta$ is from 0 to about 0.2,
wherein each controlled binary macrosegregated powder particle has a chemically binary structure with a first chemical concentration at a first side of each controlled binary macrosegregated powder particle and a second concentration on an oppositely disposed second side of each controlled binary macrosegregated powder particle, and
wherein the second concentration is different from the first concentration; and
a condensed-phase binder mixed with the particles to form a mixture, wherein the binder is selected from the group consisting of an organic binder and an inorganic binder, and wherein the ratio by weight of particles to binder is about 5:1 or less.

2. The article of claim 1, wherein the binder is an organic binder selected from the group consisting of dimethyl silicone, silicone-modified epoxy, poly(dimethyl-siloxane), poly(dimethyl-siloxane-co-methylphenyl-siloxane), polyurethane, polyimide, polyamide, polyurea, polyimide, polyester, polyethylene terepthalate polyester, and polytetrafluoroethylene.

3. The article of claim 1, wherein the binder is an inorganic silicate.

4. The article of claim 1, wherein the binder is potassium silicate.

5. The article of claim 1, wherein the mixture of binder and particles is flowable.

6. The article of claim 1, wherein the mixture of binder and particles is a freestanding solid film.

7. The article of claim 1, wherein the mixture of binder and particles is a solid.

8. The article of claim 1, wherein the mixture of binder and particles is a solid paint layer in contact with a surface of a substrate.

9. The article of claim 1, wherein the ratio by weight of particles to binder is from about 2:1 to about 5:1.

10. The article of claim 1, wherein the plurality of particles further comprises a plurality of optically active secondary particles.

11. The article of claim 1, wherein the plurality of particles further comprises a plurality of inert particles.

12. A spacecraft, comprising
a skin; and
an article overlying the skin, the article comprising
a plurality of particles comprising a plurality of controlled binary macrosegregated powder particles,
wherein each controlled binary macrosegregated powder particle has a net composition of $A[xAl(1-x)Ga]_2O_4(\delta D)$, A is selected from the group consisting of zinc, magnesium, and cadmium, D is a dopant selected from the group consisting of a cationic dopant having an ionic valence greater than +2 and an anionic dopant, the value of x is from greater than 0 to less than 1, and the value of $\delta$ is from 0 to about 0.2,
wherein each controlled binary macrosegregated powder particle has a chemically binary structure with a first chemical concentration at a first side of each controlled binary macrosegregated powder particle and a second concentration on an oppositely disposed second side of each controlled binary macrosegregated powder particle, and
wherein the second concentration is different from the first concentration, and
a condensed-phase binder mixed with the particles to form a mixture, wherein the binder is selected from the group consisting of an organic binder and an inorganic binder, and wherein the ratio by weight of particles to binder is about 5:1 or less.

13. The spacecraft of claim 12, wherein the mixture of binder and particles is a freestanding solid film.

14. The spacecraft of claim 12, wherein the mixture of binder and particles is a solid paint layer in contact with a surface of a substrate.

15. An article comprising
a plurality of particles comprising a plurality of controlled binary macrosegregated powder particles,
wherein each controlled binary macrosegregated powder particle comprises at least two constituent elements,
wherein each controlled binary macrosegregated powder particle has a chemically binary structure with a first chemical concentration at a first side of each controlled binary macrosegregated powder particle and a second concentration on an oppositely disposed second side of each controlled binary macrosegregated powder particle, and
wherein the second concentration is different from the first concentration.

16. The article of claim 15, wherein the article further includes
a condensed-phase binder mixed with the particles to form a mixture, wherein the binder is selected from the group consisting of an organic binder and an inorganic binder, and wherein the ratio by weight of particles to binder is about 5:1 or less.

17. The article of claim 16, wherein the binder is an organic binder selected from the group consisting of dimethyl silicone, silicone-modified epoxy, poly(dimethyl-siloxane), poly(dimethyl-siloxane-co-methylphenyl-siloxane), polyurethane, polyimide, polyamide, polyurea, polyimide, polyester, polyethylene terepthalate polyester, and polytetrafluoroethylene.

18. The article of claim 16, wherein the binder is an inorganic silicate.

19. The article of claim 16, wherein the binder is potassium silicate.

20. The article of claim 16, wherein the mixture of binder and particles is flowable.

21. The article of claim 16, wherein the mixture of binder and particles is a freestanding solid film.

22. The article of claim 16, wherein the mixture of binder and particles is a solid.

23. The article of claim 16, wherein the mixture of binder and particles is a solid paint layer in contact with a surface of a substrate.

24. The article of claim 16, wherein the ratio by weight of particles to binder is from about 2:1 to about 5:1.

25. The article of claim 15, wherein the plurality of particles further comprises a plurality of optically active secondary particles.

26. The article of claim 15, wherein the plurality of particles further comprises a plurality of inert particles.

27. A spacecraft, comprising
a skin; and
an article overlying the skin, the article comprising
a plurality of particles comprising a plurality of controlled binary macrosegregated powder particles, wherein each controlled binary macrosegregated powder particle has a chemically binary structure with a first chemical concentration at a first side of each controlled binary macrosegregated powder particle and a second concentration on an oppositely disposed second side of each controlled binary macrosegregated powder particle, and
wherein the second concentration is different from the first concentration, and
a condensed-phase binder mixed with the particles to form a mixture, wherein the binder is selected from the group consisting of an organic binder and an inorganic binder, and wherein the ratio by weight of particles to binder is about 5:1 or less.

28. The spacecraft of claim 27, wherein the mixture of binder and particles is a freestanding solid film.

29. The spacecraft of claim 27, wherein the mixture of binder and particles is a solid paint layer in contact with a surface of a substrate.

* * * * *